US012321554B2

United States Patent
Zhang et al.

(10) Patent No.: US 12,321,554 B2
(45) Date of Patent: Jun. 3, 2025

(54) TOUCH SUBSTRATE, TOUCH MODULE, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yuanqi Zhang, Beijing (CN); Shun Zhang, Beijing (CN); Yi Zhang, Beijing (CN); Ping Wen, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/283,824

(22) PCT Filed: Oct. 26, 2021

(86) PCT No.: PCT/CN2021/126476
§ 371 (c)(1),
(2) Date: Sep. 25, 2023

(87) PCT Pub. No.: WO2022/205866
PCT Pub. Date: Oct. 6, 2022

(65) Prior Publication Data
US 2024/0168592 A1    May 23, 2024

(30) Foreign Application Priority Data
Mar. 31, 2021   (CN) .......................... 202110348219.0

(51) Int. Cl.
*G06F 3/044* (2006.01)
*G06F 3/041* (2006.01)

(52) U.S. Cl.
CPC .. *G06F 3/0443* (2019.05); *G06F 2203/04102* (2013.01); *G06F 2203/04107* (2013.01)

(58) Field of Classification Search
CPC ...... G06F 3/044; G06F 3/0443; G06F 3/0446; G06F 3/0445; G06F 3/0448;
(Continued)

(56) References Cited

U.S. PATENT DOCUMENTS

2014/0132335 A1\* 5/2014 Rauhala ............. H03K 17/9622
   327/517
2015/0220193 A1\* 8/2015 Choe ..................... G06F 3/0446
   345/174

(Continued)

FOREIGN PATENT DOCUMENTS

CN    104461094 A    3/2015
CN    105045428 A    11/2015
(Continued)

OTHER PUBLICATIONS

Machine translation to TW_201519022 (Year: 2015).\*
(Continued)

*Primary Examiner* — Xuemei Zheng
(74) *Attorney, Agent, or Firm* — XSENSUS LLP (57) ABSTRACT

Provided in the present application are a touch substrate, a touch module, and a display device. The touch substrate includes a base substrate, a touch sensing layer, a plurality of first leads and a plurality of second leads, a shielding line, and a ground line. In a direction in which the shielding line is away from the base substrate, at least one first slit cutting through the shielding line and/or at least one second slit cutting through the ground line is formed. The first slit extends in a length direction of the shielding line, and the second slit extends in a length direction of the ground line.

18 Claims, 5 Drawing Sheets

(58) Field of Classification Search
CPC ....... G06F 3/04164; G06F 2203/04102; G06F 2203/04103; G06F 2203/04107; G06F 2203/0411; G06F 2203/04112; G06F 1/1652

See application file for complete search history.

(56) References Cited

U.S. PATENT DOCUMENTS

| | | | |
|---|---|---|---|
| 2015/0316812 A1 | 11/2015 | Mayumi et al. | |
| 2016/0070389 A1 | 3/2016 | Lee et al. | |
| 2019/0278408 A1 | 9/2019 | Lee et al. | |
| 2020/0401274 A1* | 12/2020 | Moon | G06F 3/0445 |
| 2022/0262866 A1* | 8/2022 | Kim | G06F 3/0446 |

FOREIGN PATENT DOCUMENTS

| | | |
|---|---|---|
| CN | 107329626 A | 11/2017 |
| CN | 113050840 A | 6/2021 |
| TW | 201519022 A * | 5/2015 |
| TW | 201908944 A | 3/2019 |
| WO | 2014/092049 A1 | 6/2014 |

OTHER PUBLICATIONS

International Search Report and Written Opinion mailed on Jan. 26, 2022, in corresponding PCT/CN2021/126476, 8 pages.

Office Action issued on Mar. 16, 2022, in corresponding Chinese patent Application No. 202110348219.0, 13 pages.

Office Action issued on Dec. 2, 2022, in corresponding Chinese patent Application No. 202110348219.0, 12 pages.

Decision of Rejection issued on Jun. 2, 2023, in corresponding Chinese patent Application No. 202110348219.0, 10 pages.

Notice of Allowance issued on Mar. 4, 2024, in corresponding Chinese patent Application No. 202110348219.0, pages.

* cited by examiner

TOUCH SUBSTRATE, TOUCH MODULE, AND DISPLAY DEVICE

CROSS REFERENCE TO RELATED APPLICATION(S)

The present application is a 35 U.S.C. 371 national phase application of PCT International Application No. PCT/CN2021/126476 filed on Oct. 26, 2021, which claims the priority of the Chinese patent application No. 202110348219.0, entitled "Touch Substrate, Touch Module, and Display Device" and filed on Mar. 31, 2021, the contents of both are incorporated hereby in their entireties as part of the present application.

TECHNICAL FIELD

The present disclosure relates to the field of display technology, and specifically, to a touch substrate, a touch module, and a display device.

BACKGROUND

With the rapid development of display technology, capacitive touch display devices have gradually become popular in people's lives. At present, in a touch panel, detection of a touch position is usually implemented by arranging transmitting electrodes and receiving electrodes in an intersecting way along mutually orthogonal directions on the panel. However, electrode channels in an existing touch panel will be interfered by various signals, which will affect the touch performance.

SUMMARY

The purpose of embodiments of the present disclosure is to provide a touch substrate, a touch module, and a display device, which can reduce the interference to electrode channels by various signals, thereby improving the touch performance.

One aspect of the present disclosure provides a touch substrate, which includes:
  abase substrate;
  a touch sensing layer, formed on a side of the base substrate, and including a plurality of touch patterns arranged in an array, where the array includes a plurality of rows of first touch patterns and a plurality of columns of second touch patterns;
  a plurality of first leads and a plurality of second leads, formed on a side of the base substrate, where one end of each first lead among the plurality of first leads is connected to a respective row among the plurality of rows of first touch patterns, and the other end of each first lead is used for connecting to a flexible circuit board; and where one end of each second lead among the plurality of second leads is connected to a respective row among the plurality of rows of second touch patterns, and the other end of each second lead is used for connecting to the flexible circuit board;
  a shielding line, arranged on a side of the base substrate, and further arranged on the same layer as the first leads and/or the second leads, where the shielding line is at least formed on a side of part of the first leads or the second leads; and
  a ground line, formed on an edge region of the base substrate, and arranged on the same layer as the first leads and/or the second leads.

In a direction in which the shielding line is away from the base substrate, at least one first slit cutting through the shielding line and/or at least one second slit cutting through the ground line is formed. The first slit extends in a length direction of the shielding line, and the second slit extends in a length direction of the ground line.

In an exemplary embodiment of the present disclosure, the first slit divides the shielding line into a plurality of sub-shielding lines, where at least one end of one sub-shielding line is electrically connected with at least one end of the sub-shielding line adjacent to the one sub-shielding line.

In an exemplary embodiment of the present disclosure, a difference between a width of the first slit on a side of the sub-shielding line and a width of a spacing is less than 5 μm, where the spacing is a spacing between the first lead or the second lead adjacent to the sub-shielding line on the other side of sub-shielding line.

In an exemplary embodiment of the present disclosure, a difference between a width of the sub-shielding line and a width of the first lead or the second lead adjacent to the sub-shielding line is less than 10 μm.

In an exemplary embodiment of the present disclosure, ends of the plurality of sub-shielding lines away from the flexible circuit board are connected together.

In an exemplary embodiment of the present disclosure, the shielding line is located between the first leads and the second leads, and/or located between the ground line and the first leads or the second leads.

In an exemplary embodiment of the present disclosure, the second slit divides the ground line into a plurality of sub-ground lines, where at least one end of one sub-ground line is electrically connected with at least one end of the sub-ground line adjacent to the one sub-ground line.

In an exemplary embodiment of the present disclosure, ends of the plurality of sub-ground lines away from the flexible circuit board are connected together.

In an exemplary embodiment of the present disclosure, each of the first touch patterns includes a plurality of first electrodes, and the plurality of first electrodes in each of the first touch patterns are connected in series through a plurality of first wires. Each of the second touch patterns includes a plurality of second electrodes, and the plurality of second electrodes in each of the second touch patterns are connected in series through a plurality of second wires. An insulation layer is formed between each first wire and the respective second wire.

In an exemplary embodiment of the present disclosure, the first leads are arranged on the same layer as the first wires and/or the second wires, and the second leads are arranged on the same layer as the first wires and/or the second wires.

Another aspect of the present disclosure provides a touch module, which includes:
  a flexible circuit board having a plurality of pins; and
  the touch substrate provided by any one of the above embodiments.

The shielding line includes a plurality of sub-shielding lines, and the plurality of sub-shielding lines of the shielding line are connected to the same pin; and/or the ground line includes a plurality of sub-ground lines, and the plurality of sub-ground lines of the ground line are connected to the same pin.

Yet another aspect of the present disclosure provides a display device, the display device including:

a display module: and the touch module provided in the above embodiments, where the touch module is arranged on a side of the display module.

In an exemplary embodiment of the present disclosure, the display device further includes:

a barrier dam, arranged on the base substrate, and located on a side of the ground line facing the periphery of the base substrate, where a spacing between the orthographic projection on the base substrate of the barrier dam and the orthogonal projection on the base substrate of the sub-ground line close to the periphery of the base substrate is greater than 20 μm.

In the touch substrate provided by the present disclosure, a shielding line is introduced between different signal lines. In order to ensure the shielding effect, the width of the shielding line is generally designed to be relatively large, while the width of the channel between adjacent signal lines is relatively small due to limitations of the frame, etc. As a result, widths of adjacent lines are very different, which is prone to electrostatic shock. When a cut-through first slit is formed on the shielding line, the relative width of the shielding line at the first slit is reduced, so that the width of the shielding line at the first slit is reduced relative to that of the adjacent first lead or second lead. This makes the widths of the two to be closer, thereby avoiding electrostatic shock. At the same time, the signal line will be interfered by peripheral signals. Shielding lines and ground signal lines are added at the outermost edge of the channel, but there are still interference problems. By forming a cut-through second slit on the ground line, a plurality of shielding lines are formed at the second slit, thereby improving the shielding effect, and further preventing the signal lines from being interfered by peripheral signals.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and together with the description serve to explain the principle of the present disclosure. Apparently, the drawings in the following description are only some embodiments of the present disclosure, and those skilled in the art can obtain other drawings according to these drawings without creative efforts.

DETAILED DESCRIPTION OF THE EMBODIMENTS

The technical solution of the present disclosure will be further described in detail below by mean of embodiments and in conjunction with the accompanying drawings. In the specification, the same or similar reference numbers indicate the same or similar components. The following description of embodiments of the present disclosure with reference to the accompanying drawings is intended to explain the general inventive concept of the present disclosure, and should not be understood as a limitation of the present disclosure.

Additionally, in the following detailed description, for convenience of explanation, numerous specific details are set forth to provide a comprehensive understanding of the disclosed embodiments. It will be apparent, however, that one or more embodiments may be practiced without these specific details.

The present inventor(s) has found that in the electrode layout scheme proposed by Flexible Multiple Layer on Cell (FMLOC) technology, the transmitting (Tx) electrode and the receiving (Rx) electrode are laid out on the same layer. The Tx electrode and the Rx electrode form a pattern unit, and the touch position is determined by monitoring changes in the electrical parameters of the pattern. The pattern part includes the touch pattern (also referred to as Sensor) in the display area and the channel (also referred to as Trace) in the non-display area connecting the display area and the IC. Signal interferences will occur between different electrode channels (such as the channel of the sending electrode, Tx Trace, and the channel of the receiving electrode, Rx Trace), thus affecting the touch performance.

Figure 2:
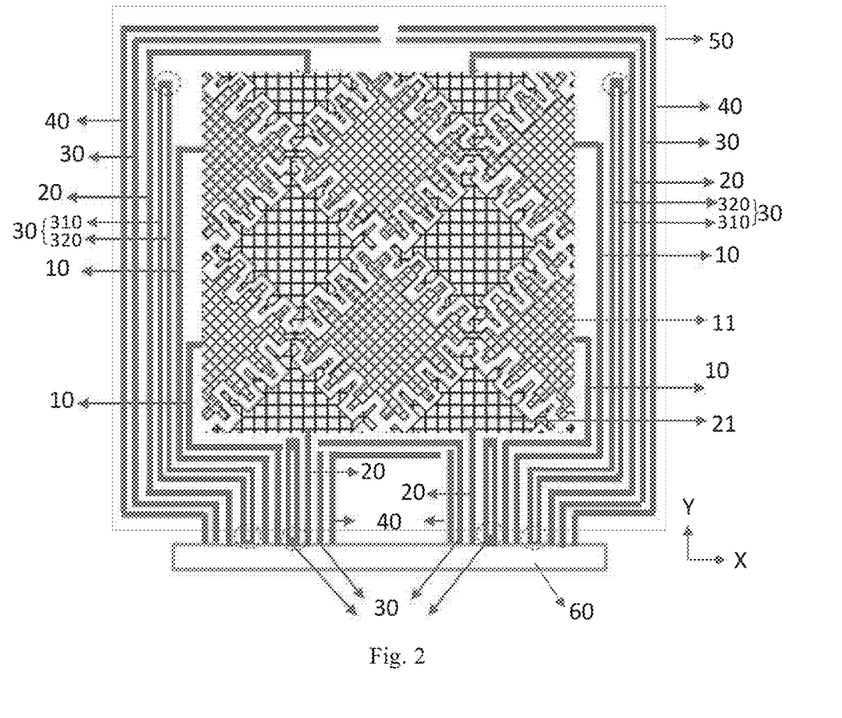
FIG. 2 is a schematic wiring diagram of a touch substrate according to an embodiment of the present disclosure.

To address the above technical problems, the present disclosure provides a touch substrate. As shown in FIG. 2, the touch substrate includes: a base substrate 50, a touch sensing layer, a plurality of first leads 10, a plurality of second leads 20, a shielding line 30, and a ground line 40. The touch sensing layer is formed on one side of the base substrate 50. The touch sensing layer includes a plurality of touch patterns arranged in an array. The array includes a plurality of rows of first touch patterns and a plurality of columns of second touch patterns. A plurality of first leads 10 and a plurality of second leads 20 are formed on one side of the base substrate 50. One end of each first lead among the plurality of first leads 10 is connected to a respective row among the plurality of rows of first touch patterns, and the other end of each first lead is used for connecting to the flexible circuit board. One end of each second lead among the plurality of second leads 20 is connected to a respective row among the plurality of rows of second touch patterns, and the other end of each second lead is used for connecting to the flexible circuit board. The shielding line 30 is provided on one side of the base substrate 50, and is further provided on the same layer as the first leads 10, or provided on the same layer as the second leads 20, or provided on the same layer as the first leads 10 and the second leads 20 (in this embodiment, the first leads 10 and the second leads 20 are arranged on the same layer). The shielding line 30 is at least formed on one side of part of the first leads 10 or the second leads 20. The ground line 40 is formed in the edge area of the base substrate 50, and is arranged on the same layer as the first leads 10, or arranged on the same layer as the second leads 20, or arranged on the same layer as the first leads 10 and the second leads 20.

In a direction in which the shielding line 30 is away from the base substrate 50, the shielding line 30 is formed with a cut-through first slit 320; or the ground line 40 is formed with a cut-through second slit 420; or the shielding line 30 is formed with a cut-through first slit 320, and the ground line 40 is formed with a cut-through second slit 420 at the same time. The first slit 320 extends in the length direction of the shielding line 30, and the second slit 420 extends in the length direction of the ground line 40.

Figure 1:
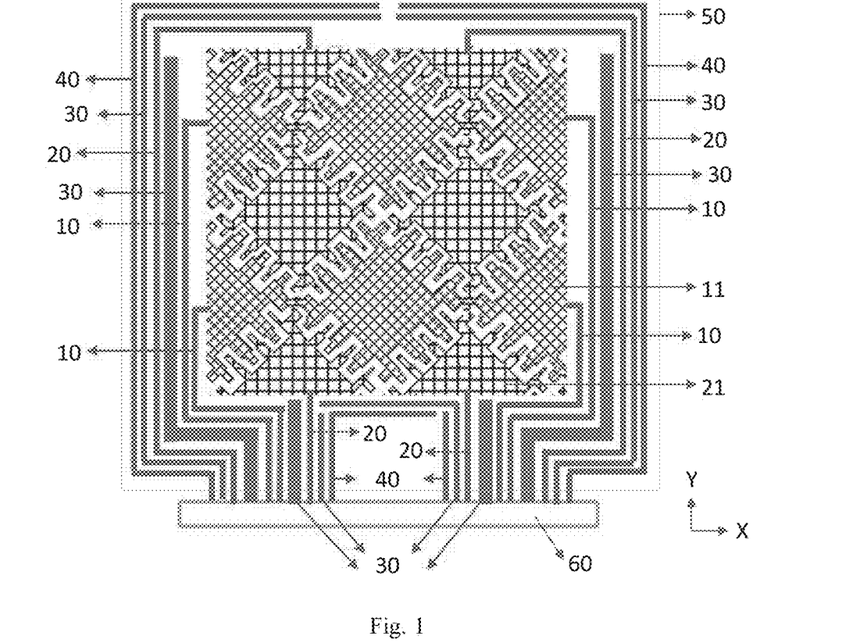
FIG. 1 is a schematic wiring diagram of a touch substrate provided by the present disclosure.
Figure 6:
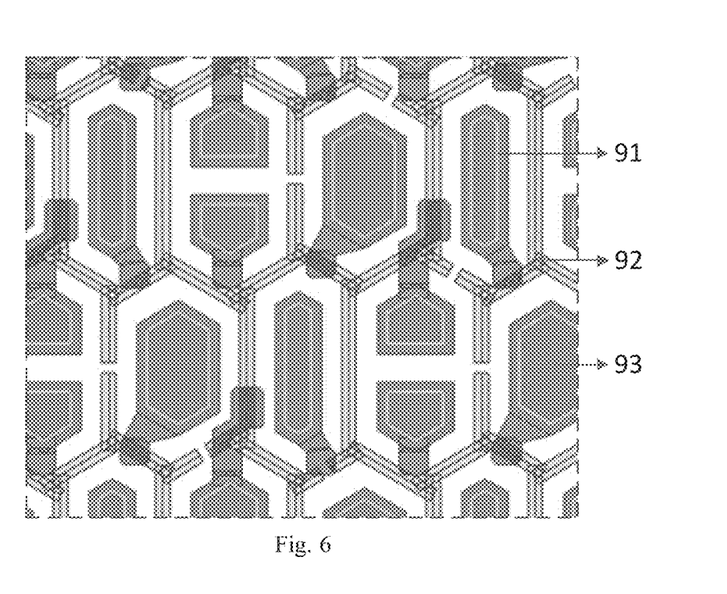
FIG. 6 is a schematic wiring diagram in a display area of a touch substrate according to an embodiment of the present disclosure.

Specifically, the base substrate 50 includes a display area and a non-display area surrounding the display area. As shown in FIG. 6, the electrode line 92 for the touch pattern is arranged in the display area, the electrode line 92 is arranged in the gap of the RGB sub-pixels, and the transparent electrode 93 is located on the pixel opening 91. The electrode line 92 is arranged in the pixel gap between pixel openings 91, so as to prevent the pixel emission from being blocked. The non-display area on the periphery of the display area is the Trace wiring area. The Trace connects the display area Sensor and the flexible circuit board as a channel for signal transmission and reception. As shown in FIG. 1, it is a wiring schematic diagram of the left and right access of the receiving channel (Rx Trace), and the upper and lower access of the transmitting channel (Tx Trace) (2T2R). It can be seen from FIG. 1 that the neighboring distance between some transmitting channels and receiving channels is very far, which will lead to the capacitive coupling between different signals, thereby resulting in a large mutual capacitance value of the electrode pattern units at the four corners of the screen, and seriously affecting the touch performance of the screen, or even rendering it to be unusable. Therefore, shielding lines 30 are used to separate different signals. From FIG. 1, it can be found that a Guard line is set between the transmitting channel and the receiving channel for the purpose of separation, and the Guard line is used as a shielding line 30 to prevent signal interferences between the transmitting channel and the receiving channel. In order to have a better shielding effect, the width of the Guard line is designed to be very wide, for example greater than 25 μm, and the width of the Guard on the left and right sides is greater than 50 μm. However, due to limitations of the frame, the width of the Trace line adjacent to the Guard line is relatively small, with a minimum value of more than 2.5 μm. Widths of the adjacent Trace and Guard lines are very different. When static electricity is introduced from outside, static electricity damages may easily occur.

The Guard line may be provided with the same signal as the transmission signal on the transmission lead, so that the potential level of the signal on the Guard line is the same or equivalent to that of the transmission signal on the transmission lead. For example, the signal on the Guard line may be a signal with the same and synchronous waveform as the transmission signal, so that the coupling capacitance between the Guard line and the transmission lead can be eliminated.

Specifically, the shielding line may be located between the first lead and the second lead; or the shielding line may be located between the ground line and the first lead or the second lead. Alternatively, as shown in FIG. 2, part of the shielding line may be located between the first lead and the second lead, and another part of the shielding line is located between the ground line and the first lead or the second lead.

The shielding line 30 is introduced between different signal lines (first lead 10, second lead 20). In order to ensure the shielding effect, the width of the shielding line 30 is generally designed to be not less than 25 μm, and the width of the channel between adjacent signal lines is relatively small due to limitations of the frame. This results in a large difference in width between adjacent lines, and is prone to electrostatic shock. When the cut-through first slit 320 is formed on the shielding line 30, the relative width of the shielding line 30 at the first slit 320 is reduced, so that the width of the shielding line 30 at the first slit 320 is reduced relative to the width of the first lead 10 or the second lead 20. This makes the widths of the first lead 10 and the second lead 20 to be closer to each other, thereby avoiding electrostatic shock. At the same time, the signal line will be interfered by peripheral signals. The shielding line 30 and the ground line 40 are added at the outermost periphery of the channel, but there is still an interference problem. By forming the cut-through second slit 420 on the ground line 40, it is equivalent to forming a plurality of shielding lines 30 at the second slit 420, thereby improving the shielding effect, and further preventing the signal line from being interfered by peripheral signals.

In one embodiment of the present disclosure, the first slit 320 divides the shielding line 30 into a plurality of sub-shielding lines 310. That is, the shielding line 30 is separated along the length direction to form a plurality of sub-shielding lines 310. The width of the sub-shielding line 310 after division is equivalent to that of the adjacent signal line, so as to prevent electrostatic shock. In addition, the distance between the plurality of sub-shielding lines 310 (i.e., the width of the first slit 320) may also be equivalent to the distance between the sub-shielding lines 310 and the adjacent signal lines, thereby further preventing electrostatic shock. The first slit 320 may divide the shielding line 30 into two, three, or more sub-shielding lines 310, so that the guard is equivalent to the adjacent Trace line in width and spacing, thereby preventing electrostatic shock.

For example, as shown in FIG. 2, the first slit 320 may divide the shielding line 30 into two sub-shielding lines 310. The distance between the two sub-shielding lines 310 is equivalent to the width of the spacing between the sub-shielding line 310 and the adjacent first lead 10 or second lead 20 on the other side of the sub-shielding line 310, and the difference (the absolute value of the width difference) among the two is less than 5 μm, such as 5 μm, 4 μm, 3 μm, 2 μm, 1 μm, etc. Of course, the above mentioned difference may also be limited to less than 6 μm, 8 μm, or 10 μm, etc., depending on specific circumstances, and the present disclosure is not limited in this regard. The difference between the width of the first slit 320 on one side of the sub-shielding line 310 and the width of the spacing, which spacing is between the sub-shielding line 310 and the adjacent first lead 10 or second lead 20 on the other side of the sub-shielding line 310, is set to be smaller than the above target value. This renders it to be equivalent to the width of the spacing between the sub-shielding line 310 and the adjacent first lead or second lead 20, so as to avoid electrostatic shock.

For example, after the first slit 320 divides the shielding line 30 into a plurality of sub-shielding lines 310, the difference between the width of the sub-shielding line 310 and the width of the adjacent first lead 10 or second lead (the absolute value of the width difference) is less than 10 μm. For example, it may be 10 μm, 8 μm, 5 μm, 3 μm, 1 μm, etc. Of course, the above mentioned difference may also be limited to be less than 12 μm, 15 μm, or 20 μm, etc., depending on specific circumstances, and the present disclosure is not limited in this regard. The first slit 320 divides the shielding line 30 into a plurality of sub-shielding lines 310, and the difference between the width of the sub-shielding line 310 and the width of the adjacent first lead 10 or second lead 20 is smaller than the above-mentioned target value. This renders the width of the sub-shielding lines 310 to be equivalent to that of the adjacent first lead 10 or second lead 20, so as to avoid electrostatic shock.

In an embodiment of the present disclosure, the width of the first lead 10 may be 2 μm-50 μm, such as 2 μm, 2.5 μm, 5 μm, 10 μm, 20 μm, 30 μm, 40 μm, 50 μm, etc., which are not listed one by one herein in the present disclosure. But, the present disclosure is not limited thereto. The width of the first lead 10 may also be less than 2 μm or greater than 50 μm, depending on the specific circumstances. The width of the second lead 20 may be 2 μm-50 μm, such as 2 μm, 5 μm, 10 μm, 20 μm, 30 μm, 40 μm, 50 μm etc., which are not listed one by one herein in the present disclosure. But, the present disclosure is not limited thereto. The width of the second lead 20 may also be less than 2 μm or greater than 50 μm, depending on specific circumstances.

The distance between the two sides of the first lead 10 and the second lead 20 is 4 μm-20 μm, such as 4 μm, 5 μm, 10 μm, 15 μm, 20 μm, etc., which are not listed one by one herein in the present disclosure. But, the present disclosure is not limited thereto. The distance between the two sides of the first lead 10 and the second lead 20 may also be less than 4 μm or greater than 20 μm, depending on specific circumstances.

The first lead 10 and the second lead 20 are arranged on the same layer on the base substrate 50. That is, they may be made by using the same patterning process to reduce the mask cost. But, the present disclosure is not limited thereto, and they may also be made by using different patterning processes, depending on the specific circumstances. The first lead 10 and the second lead 20 are located in the non-display area of the base substrate 50. The materials of the first lead 10 and the second lead 20 may be metal, conductive oxide, or a combination thereof. For example, the metal may be titanium, platinum, ruthenium, gold, silver, molybdenum, aluminum, tungsten, copper, neodymium, chromium, tantalum, or alloys thereof, or combinations thereof. The conductive oxide may be indium zinc oxide (IZO), aluminum doped zinc oxide (AZO), indium tin oxide (ITO), zinc gallium oxide (GZO), zinc tin oxide (ZTO), or combinations thereof. The materials of the first lead 10 and the second lead 20 may be the same or different. Using the same material helps to reduce the process cost and difficulty in forming the first lead 10 and the second lead 20.

In an embodiment of the present disclosure, the width of the shielding line 30 (the sum of the width of the sub-shielding line 310 and the width of the first slit 320) is 25 μm-140 μm, such as 25 μm, 50 μm, 70 μm, 100 μm, 120 μm, 140 μm, etc., which are not listed one by one herein in the present disclosure. But, the present disclosure is not limited thereto. The width of the shielding line 30 may also be less than 25 μm or greater than 140 μm, depending on the specific situations.

The width of the sub-shielding line 310 is 4 μm-50 μm. For example, it may be 2 μm, 5 μm, 10 μm, 20 μm, 30 μm, 40 μm, 50 μm, etc., which are not listed one by one herein in the present disclosure. But, the present disclosure is not limited thereto. The width of the sub-shielding line 310 may also be less than 4 μm or greater than 50 μm, depending on the specific situations. The widths of the plurality of sub-shielding lines 310 may be the same or different.

The width of the first slit 320 between adjacent sub-shielding lines 310 is 4 μm-20 μm. For example, it may be 4 μm, 10 μm, 12 μm, 15 μm, 18 μm, 20 μm, etc., which are not listed one by one herein in the present disclosure. But, the present disclosure is not limited thereto. The width of the first slit 320 between adjacent sub-shielding lines 310 may be less than 4 μm or greater than 20 μm, depending on the specific circumstances. The first slit 320 may be a slit with the same width along the length direction, or may be a slit with different widths along the length direction.

The material of the sub-shielding line 310 may be metal, conductive oxide, or combinations thereof. For example, the metal may be titanium, platinum, ruthenium, gold, silver, molybdenum, aluminum, tungsten, copper, neodymium, chromium, tantalum, or their alloys, or combinations thereof. The conductive oxide may be indium zinc oxide (IZO), aluminum-doped zinc oxide (AZO), indium tin oxide (ITO), zinc gallium oxide (GZO), zinc tin oxide (ZTO), or combinations thereof.

In an embodiment of the present disclosure, the plurality of sub-shielding lines 310 is connected together. That is, the first slit 320 does not completely separate the shielding line 30, and there is still a connection part between two sub-shielding lines 310.

As shown in FIG. 2, after the shielding line 30 is divided, ends of the sub-shielding lines 310 away from the connected flexible circuit board are connected together (the part circled by the dotted line at the end of the shielding line 30), and the sub-shielding lines 310 after division of the shielding line form a loop. The present disclosure is not limited thereto. After the shielding line 30 is divided, ends of the sub-shielding lines 310 away from the connected flexible circuit board may be disconnected.

In an embodiment of the present disclosure, the second slit 420 divides the ground line 40 into a plurality of sub-ground lines 410. That is, the ground line 40 is separated along the length direction to form a plurality of sub-ground lines 410. Thus, it is equivalent to forming a plurality of shielding lines 30 at the second slit 420, thereby improving the shielding effect, and further preventing the signal line from being interfered by peripheral signals.

Figure 3:
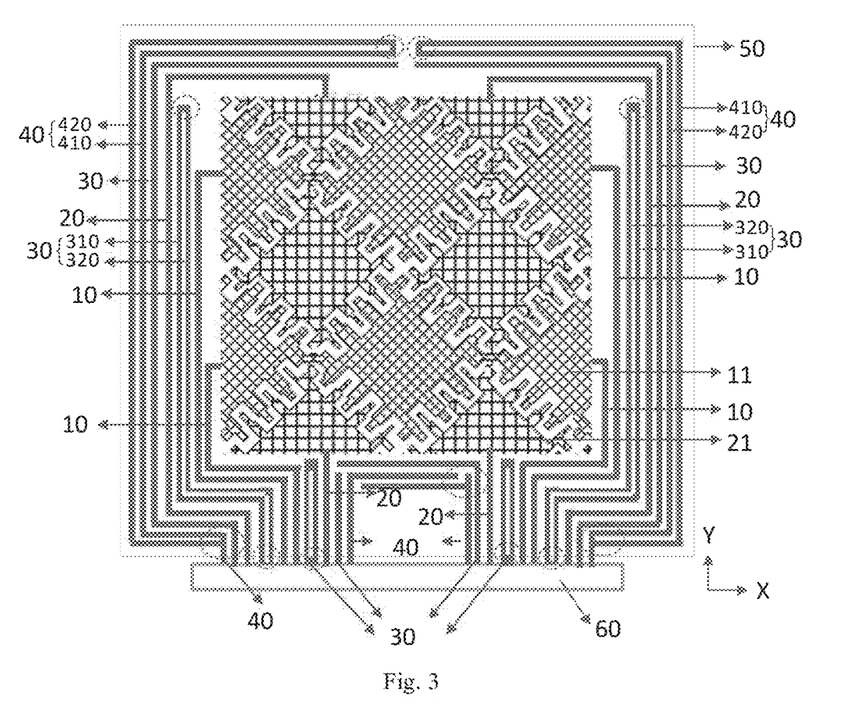
FIG. 3 is a schematic wiring diagram of a touch substrate according to another embodiment of the present disclosure.

For example, as shown in FIG. 3, the second slit 420 may divide the ground line 40 into two sub-ground lines 410. Dividing the ground line 40 into two sub-ground lines 410 is equivalent to forming a plurality of shielding lines 30, so as to achieve the purpose of improving the shielding effect and further avoiding interference of the signal line by peripheral signals.

The width of the sub-ground line 410 is 10 μm-20 μm. For example, it may be 10 μm, 12 μm, 15 μm, 18 μm, 20 μm, etc., which are not listed one by one herein in the present disclosure. But, the present disclosure is not limited thereto. The width of the sub-ground line 410 may also be less than 10 μm or greater than 20 μm, depending on the specific circumstances. The widths of the plurality of sub-ground lines 410 may be the same or different.

The width of the second slit 420 is 5 μm-20 μm. For example, it may be 5 μm, 10 μm, 12 μm, 15 μm, 18 μm, 20 μm, etc., which are not listed one by one herein in the present disclosure. But, the present disclosure is not limited thereto. The width of the second slit 420 between adjacent sub-ground lines 410 may also be less than 5 μm or greater than 20 μm, depending on the specific circumstances. The first slit 320 may be a slit with the same width along the length direction, or may be a slit with different widths along the length direction.

The material of the sub-ground line 410 may be metal, conductive oxide, or a combination thereof. For example, the metal may be titanium, platinum, ruthenium, gold, silver, molybdenum, aluminum, tungsten, copper, neodymium, chromium, tantalum, or their alloys, or combinations thereof. The conductive oxide may be indium zinc oxide (IZO), aluminum doped zinc oxide (AZO), indium tin oxide (ITO), zinc gallium oxide (GZO), zinc tin oxide (ZTO), or combinations thereof.

In one embodiment of the present disclosure, the plurality of sub-ground lines 410 is connected together. That is, the second slit 420 does not completely separate the ground line 40, and there is a connection part between the two sub-ground lines 410.

As shown in FIG. 3, after the ground line 40 is divided, ends of the sub-ground lines 410 away from the connected flexible circuit board are connected together (the part circled by the dotted line at the end of the ground line 40), and the sub-shielding lines 310 after division of the shielding line form a loop. The present disclosure is not limited thereto. After division of the ground line 40, ends of the sub-ground lines 410 away from the connected flexible circuit board may be disconnected.

In one embodiment of the present disclosure, as shown in FIGS. 2-5, the first touch patterns are arranged along an X direction, and the second touch patterns are arranged along a Y direction. The first touch pattern includes a plurality of first electrodes 11, and the plurality of first electrodes 11 in each of the first touch patterns are connected in series through a plurality of first wires. The second touch pattern includes a plurality of second electrodes 21, and the plurality of second electrodes 21 in each of the second touch pattern are connected in series through a plurality of second wires. The area A in FIG. 5 forms a complete touch pattern. An insulation layer is formed between the corresponding first wires and second wires, thereby forming a conductive bridge structure.

The first electrode and the second electrode are made of transparent conductive material and arranged on the same layer. The materials of the first electrode and the second electrode may be Ti—Al—Ti, ITO-Ag-ITO, and the like.

The materials of the first wire and the second wire may be metal, conductive metal oxide, conductive polymer, conductive composite material, or a combination thereof. For example, the metal may be platinum, gold, silver, aluminum, chromium, nickel, copper, molybdenum, titanium, magnesium, calcium, barium, sodium, palladium, iron, manganese, or combinations thereof. The conductive metal oxide may be $InO_2$, $SnO_2$, indium tin oxide (ITO), fluorine-doped tin oxide (FTO), aluminum-doped zinc oxide (AZO), gallium-doped zinc oxide (GZO), or combinations thereof. The conductive polymer may be polyaniline, polypyrrole, polythiophene, polyacetylene, poly(3,4-ethylenedioxythiophene)/polystyrenesulfonic acid (PEDOT/PSS), or a combination thereof. The conductive composite material may be a conductive composite material in which carbon black, graphite powder, or metal fine particles, etc. are dispersed. The material of the first wire or the second wire forming the conductive bridge may be Ti—Al—Ti or ITO-Ag-ITO.

The insulation layer may be silicon oxide, silicon oxynitride, silicon nitride, or other suitable insulation materials (such as organic polymer compounds), or a combination of the above materials. The formation method of the gate insulation layer is, for example, physical vapor deposition, chemical vapor deposition, spin coating, or a combination thereof.

In one embodiment of the present disclosure, as shown in FIG. 3, the shielding line 30 is also formed between the signal line (the first lead 10 or the second lead 20) near the outermost periphery of the base substrate 50 and the ground line 40, so as to further prevent signal interferences between the transmitting channel and the receiving channel and improve the shielding effect.

In one embodiment of the present disclosure, as shown in FIG. 3, the first lead 10, the second lead 20, the shielding line 30, and the ground line 40 on the base substrate 50 are symmetrical to the center line of the base substrate 50 in the Y direction. The symmetrical setting is conducive to the consistency of electrical parameters, and helps to improve the touch performance at the edge of the touch substrate.

Figure 4:
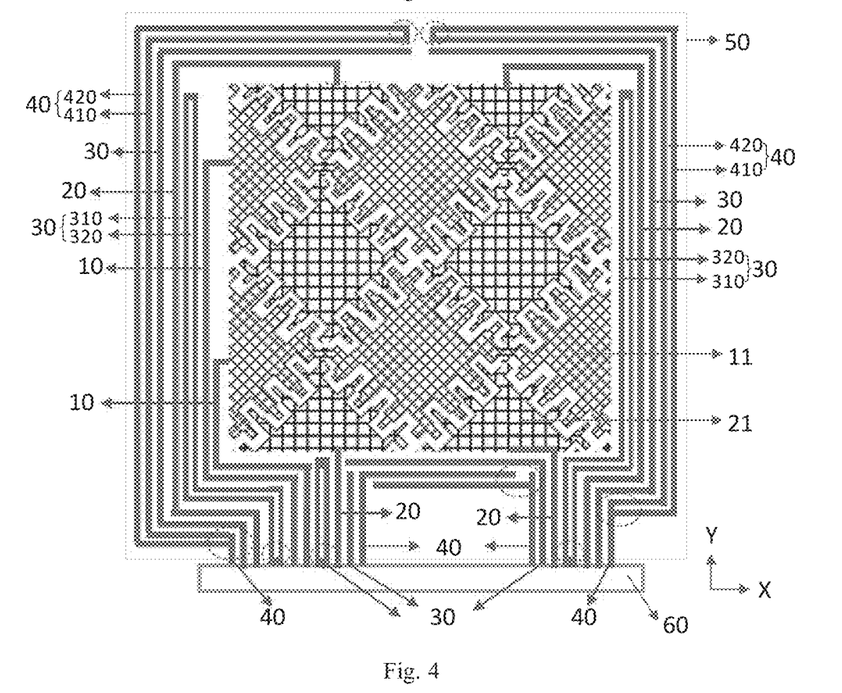
FIG. 4 is a schematic wiring diagram of a touch substrate according to another embodiment of the present disclosure.
Figure 5:
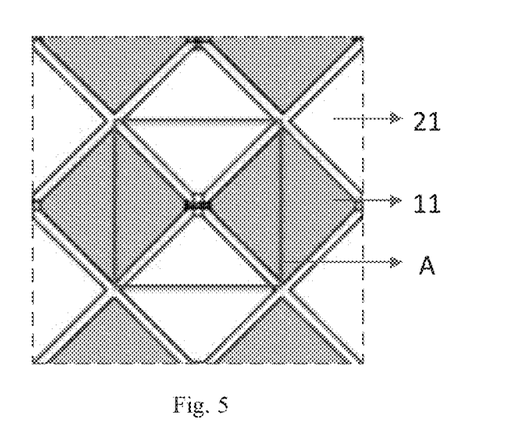
FIG. 5 is a schematic diagram of electrodes of a touch substrate according to an embodiment of the present disclosure.

In one embodiment of the present disclosure, the division of the shielding line 30 and the ground line 40 may be applied to various Trace wirings. For example, as shown in FIG. 3, wirings having access to the display area at both sides for Tx and Rx; and wirings having access to the display area at one side for Tx and at both sides for Rx, are included. As shown in FIG. 4, wirings having access to the display area at both sides for Tx and at one side for Rx; and wirings having access to the display area at one side for Tx and Rx, are included.

An embodiment of the present disclosure also provides a touch module, which includes: a flexible circuit board (chip) 60 and the touch substrate provided in the above embodiment. The flexible circuit board 60 has a plurality of pins, and each first lead 10 and each second lead 20 are electrically connected to the pins. The shielding line 30 and the ground line 40 may also be connected to the pins of the flexible circuit board 60. The flexible circuit board may determine the touch position by detecting changes in capacitance values at each touch electrode during the touch period. For the beneficial effects of the touch module, reference may be made to the above-mentioned relevant discussion about the beneficial effects of the touch substrate, which will not be described again here.

In an embodiment of the present disclosure, the flexible circuit board 60 has enough pins, and the first slit 320 may separate the shielding line 30 into a plurality of completely separated sub-shielding lines 310, and the plurality of sub-shielding lines 310 are respectively connected to the flexible circuit board through a pin. The second slit 420 may separate the ground line 40 into a plurality of completely separated sub-ground lines 410, and the plurality of sub-ground lines 410 are respectively connected to the flexible circuit board through a pin.

In another embodiment of the present disclosure, the number of pins of the flexible circuit board 60 is limited. The first slit 320 may separate the portion of the shielding line 30 leading out from the pins into a plurality of sub-shielding lines 310. That is, the plurality of sub-shielding lines 310 of the shielding line 30 are connected to the flexible circuit board through the same pin (the position circled by the dotted line where the ground line 40 is connected to the flexible circuit board in FIGS. 3 and 4). The second slit 420 may separate the portion of the ground line 40 leading out from the pins into a plurality of sub-ground lines 410. That is, the plurality of sub-ground lines 410 of the ground line 40 are connected to the flexible circuit board through the same pin (the position circled by the dotted line where the ground line 40 is connected to the flexible circuit board in FIGS. 3 and 4).

An embodiment of the present disclosure also provides a display device, which includes a display module and the above-mentioned touch module. The base substrate of the touch module may be formed on the display side of the display module. The display module may be an AMOLED display module, but is not limited thereto, depending on the specific situations. The display module of the present disclosure may include a display layer and an encapsulation layer located on the display side of the display layer. The base substrate of the touch module may be disposed on a side of the encapsulation layer away from the display layer. For the beneficial effects of the display device, reference may be made to the above-mentioned relevant discussion about the beneficial effects of the touch substrate, which will not be described again here.

Figure 7:
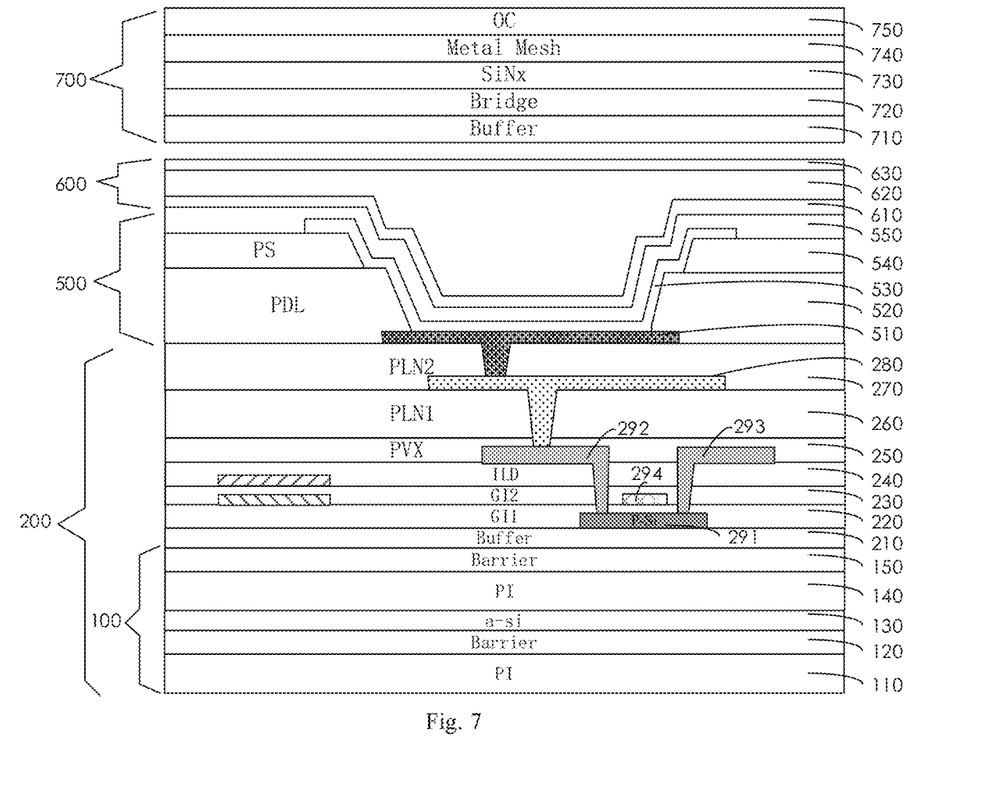
FIG. 7 is a schematic structural diagram of a display device according to an embodiment of the present disclosure.
Figure 8:
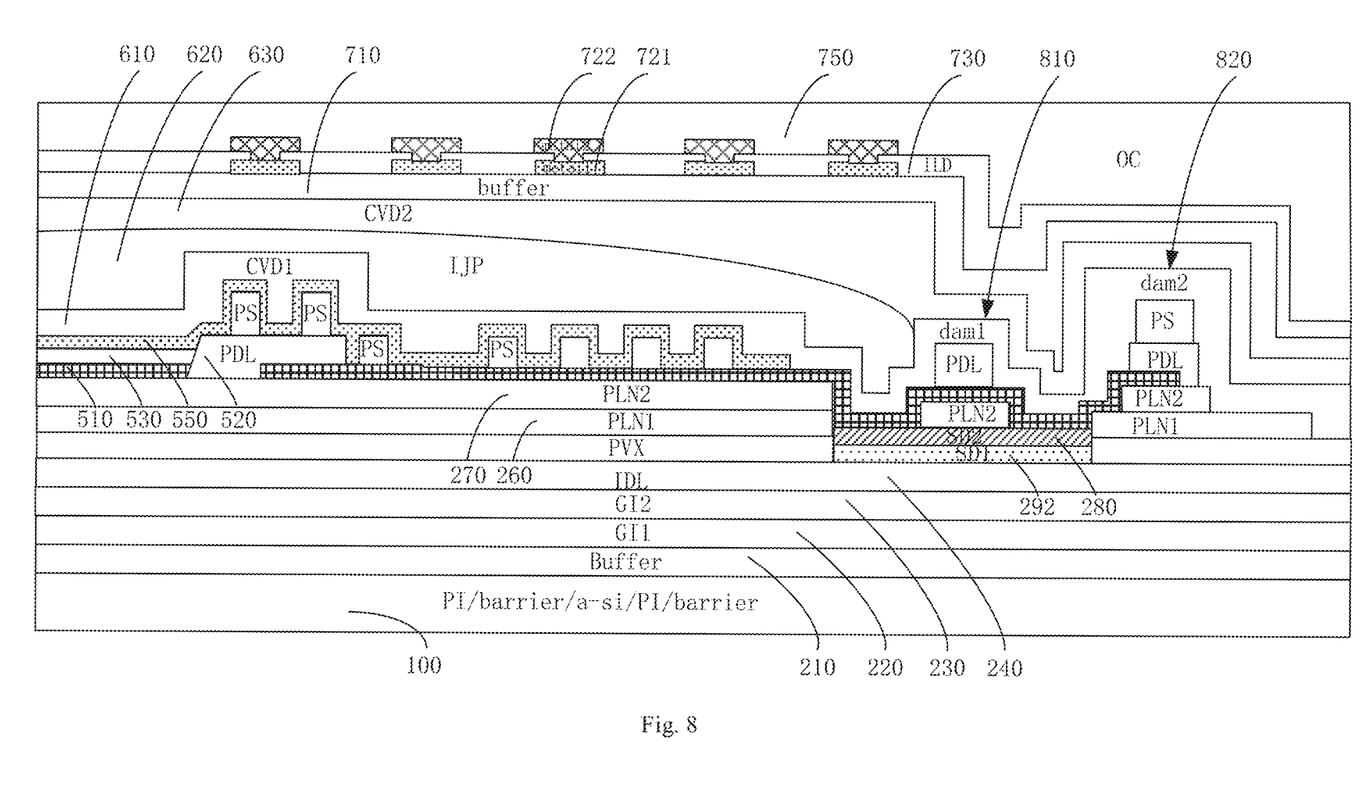
FIG. 8 is a schematic structural diagram of a display device according to another embodiment of the present disclosure.

In one embodiment of the present disclosure, as shown in FIGS. 7 and 8, the display device includes a base substrate 100, a backplane 200, a light-emitting layer 500, an encapsulation layer 600, and a flexible touch metal panel (Flexible Multi-Layer On Cell, FMLOC) 700.

The base substrate 100 includes a first substrate (PI) 110, a first barrier layer (Barrier) 120, an amorphous silicon layer (a-Si) 130, a second substrate (PI) 140, and a second barrier layer (Barrier) 150 that are stacked in sequence.

The backplane 200 includes the base substrate 100. The backplane 200 also includes: a first buffer layer (Buffer) 210 disposed on the second shielding layer 150, a polysilicon layer (p-Si) 291 disposed on the first buffer layer 210, a first insulation layer (GI1) 220 disposed on the first buffer layer 210 and covering the polysilicon layer 291, a gate 294 disposed on the first insulation layer 220, a second insulation layer (GI2) 230 disposed on the first insulation layer 220 and covering the gate 294, an interlayer insulation layer (ILD) 240 disposed on the second insulation layer 230, and a first metal layer disposed on the interlayer insulation layer 240. The first source and drain metal layer includes a first terminal 292 and a second terminal 293. The first terminal 292 and the second terminal 293 are respectively connected to the polysilicon layer 291 through via holes. The polysilicon layer 291, the first terminal 292, the second terminal 293, and the gate 294 form a transistor. The first terminal 292 is a drain, and the second terminal 293 is a source. Alternatively, the first terminal 292 is a source, and the second terminal 293 is a drain. The backplane 200 further includes: a passivation layer (PVX) 250 disposed on the interlayer insulation layer 240 and covering the first terminal 292 and the second terminal 293, a first planarization layer (PLN1) 260 disposed on the passivation layer 250, and a second source and drain metal layer 280 disposed on the first planarization layer 260. The second source and drain metal layer 280 is connected to the first terminal 292 through a via hole. The backplane 200 also includes a second planarization layer 270 disposed on the first planarization layer 260 and covering the second source and drain metal layer 280.

The light-emitting layer 500 includes a pixel definition layer (PDL) 520 disposed on the second planarization layer 270. The pixel definition layer 520 is formed with a plurality of pixel areas. The first electrode layer 510 is formed on the second planarization layer 270 in the pixel area. The first electrode layer 510 is connected to the second source and drain metal layer 280 through a via hole. A light-emitting layer 530 is formed on the first electrode layer 510. A support layer (PS) 540 is formed on the pixel definition layer 520. The support layer 540 is formed with a plurality of support pillars. A second electrode layer 550 is formed on the light-emitting layer 530. The second electrode layer 550 is a common electrode, and the second electrode layer 550 covers the light-emitting layer 530 and the support layer 540. The first electrode layer 510 may be an anode, and the second electrode layer 550 may be a common cathode. Alternatively, the first electrode layer 510 may be a cathode, and the second electrode layer 550 may be an anode.

The encapsulation layer 600 includes a first inorganic encapsulation layer (CVD1) 610, an organic encapsulation layer (IJP) 620, and a second inorganic encapsulation layer (CVD2) 630. The first inorganic encapsulation layer 610 is disposed on the second electrode layer 550.

The FMLOC film layer 700 includes a second buffer layer (Buffer) 710, a conductor layer (Bridge) 720, an interlayer insulation layer 730 (the material thereof may be SiNx), a metal mesh layer (Metal Mesh) 740, and an overlay layer (OC) 750. The conductor layer (Bridge) 720 is one of the first wire or the second wire, and the other of the first wire and the second wire is arranged on the same layer as the transmitting (Tx) electrode and the receiving (Rx) electrode. The metal mesh Layer (Metal Mesh) 740 forms Tx electrodes and Rx electrodes. The GND line and the Guard line may be double-layer wirings on the same layer as the metal layer (Metal Mesh) 740 and the conductor layer (Bridge) 720. As shown in FIG. 8, the conductor layer (Bridge) 720 may include a first conductor layer (metal1) 721 and a second conductor layer (metal2) 722.

In an embodiment of the present disclosure, the display device further includes: a barrier dam (DAM). The barrier dam is arranged on the base substrate 50 of the display substrate, and is located on the side of the ground line 40 facing the periphery of the base substrate 50. The spacing between the orthographic projection on the base substrate 50 of the barrier dam and the orthographic projection on the base substrate 50 of the sub-ground line 410 near the periphery of the base substrate 50 is greater than 20 μm, such as 20 μm, 30 μm, 40 μm, 50 μm, etc., which are not listed herein in the present disclosure.

As shown in FIG. 8, two barrier dams are formed. The first barrier dam (dam1) 810 may be composed of the first terminal 292, the second source and drain metal layer 280, the second planarization layer 270, the first electrode 510, the pixel definition layer 520, and the first inorganic encapsulation layer 610. The second barrier dam (dam2) 820 may be formed by the first planarization layer 260, the second planarization layer 270, the first electrode 510, the pixel definition layer 520, the support pillars, and the first inorganic encapsulation layer 610. The distance between the orthographic projection on the base substrate of the first barrier dam (dam1) and the orthographic projection on the base substrate of the sub-ground line near the periphery of the base substrate is greater than 20 μm.

According to embodiments of the present disclosure, the specific type of the display device is not particularly limited. Any type of touch display device commonly used in the field may be suitable, such as AMOLED display screen, mobile devices such as mobile phones, wearable devices such as watches, and VR devices, etc. Those skilled in the art can make corresponding selections according to the specific use of the display device, which will not be repeated here.

It should be noted that wordings of "on", "formed on", and "set on" as mentioned in the present application mean that one layer is directly formed or arranged on another layer, or that one layer is indirectly formed on or set on another layer, i.e., there are other layers between the two layers.

The terms of "a", "an", "the", "said", and "at least one" are used to indicate the presence of one or more elements or components, etc. The terms of "include" and "have" are used to indicate an open-ended inclusion, and means that additional elements or components, etc. may be present in addition to the listed elements or components, etc.

It should be noted that although the terms of "first", "second", etc. may be used herein to describe various areas, layers, and/or sections, these areas, layers, and/or sections should not be limited by these terms. Rather, these terms are used to distinguish one area, layer, and/or section from another.

In the present disclosure, unless otherwise stated, the term of "arranged on the same layer" as used means that two layers, parts, components, elements, or sections may be formed by the same patterning process, and that the two layers, components, components, elements, or parts are generally formed of the same material.

In the present disclosure, unless otherwise stated, the expression of "patterning process" generally includes steps such as photoresist coating, exposure, development, etching, and photoresist stripping. The expression of "one patterning process" means a process for forming patterned layers, components, members, etc. using one mask.

Other embodiments of the present disclosure will be readily apparent to those skilled in the art from consideration of the specification and practice of the content herein. The present disclosure is intended to cover any variations, uses, or adaptations of the present disclosure, which follow the general principle of the present disclosure, and include the common sense or customary technical means in the technical field that are not disclosed in the present disclosure. The specification and examples are to be considered exemplary only, with the true scope and spirit of the present disclosure indicated by the appended claims.

The invention claimed is:

1. A touch substrate, comprising:
a base substrate;
a touch sensing layer, formed on a side of the base substrate, and comprising a plurality of touch patterns arranged in an array, wherein the array comprises a plurality of rows of first touch patterns and a plurality of columns of second touch patterns;
a plurality of first leads and a plurality of second leads, formed on a side of the base substrate, wherein one end of each first lead among the plurality of first leads is connected to a respective row among the plurality of rows of first touch patterns, and the other end of each first lead is used for connecting to a flexible circuit board; and wherein one end of each second lead among the plurality of second leads is connected to a respective row among the plurality of columns of second touch patterns, and the other end of each second lead is used for connecting to the flexible circuit board;
a shielding line, arranged on a side of the base substrate, and further arranged on a same layer as the first leads and/or the second leads, wherein the shielding line is at least formed on a side of part of the first leads or the second leads; and
a ground line, formed on an edge region of the base substrate, and arranged on a same layer as the first leads and/or the second leads, wherein
in a direction in which the shielding line is away from the base substrate, at least one first slit cutting through the shielding line and/or at least one second slit cutting through the ground line is formed; and
the at least one first slit extends in a length direction of the shielding line, and the at least one second slit extends in a length direction of the ground line,
wherein the first slit divides the shielding line into a plurality of sub-shielding lines;
wherein ends of the plurality of sub-shielding lines away from the flexible circuit board are connected together; and
wherein the plurality of sub-shielding lines forms a loop.

2. The touch substrate according to claim 1, wherein at least one end of one sub-shielding line is electrically connected with at least one end of the sub-shielding line adjacent to the one sub-shielding line.

3. The touch substrate according to claim 2, wherein a difference between a width of the first slit on a side of the sub-shielding line and a width of a spacing is less than 5 μm, wherein the spacing is a spacing between the sub-shielding line and the first lead or the second lead located adjacent to the sub-shielding line on the other side of the sub-shielding line.

4. The touch substrate according to claim 2, wherein a difference between a width of the sub-shielding line and a width of the first lead or the second lead adjacent to the sub-shielding line is less than 10 μm.

5. The touch substrate according to claim 1, wherein the shielding line is located between the first leads and the second leads, and/or located between the ground line and the first leads or the first leads.

6. The touch substrate according to claim 1, wherein the second slit divides the ground line into a plurality of sub-ground lines, and at least one end of one sub-ground line is electrically connected with at least one end of the sub-ground line adjacent to the one sub-ground line.

7. The touch substrate according to claim 6, wherein ends of the plurality of sub-ground lines away from the flexible circuit board are connected together.

8. The touch substrate according to claim 1, wherein each of the first touch patterns comprises a plurality of first electrodes, wherein the plurality of first electrodes in each of the first touch patterns are connected in series through a plurality of first wires; and
each of the second touch patterns comprises a plurality of second electrodes, wherein the plurality of second electrodes in each of the second touch patterns are connected in series through a plurality of second wires, wherein an insulation layer is formed between each first wire and a respective second wire.

9. The touch substrate according to claim 8, wherein the first leads are arranged in a same layer as the first wires and/or the second wires, and
the second leads are arranged in a same layer as the first wires and/or the second wires.

10. A touch module, comprising:
a flexible circuit board, having a plurality of pins; and
a touch substrate, comprising:
a base substrate;
a touch sensing layer, formed on a side of the base substrate, and comprising a plurality of touch patterns arranged in an array, wherein the array comprises a plurality of rows of first touch patterns and a plurality of columns of second touch patterns;
a plurality of first leads and a plurality of second leads, formed on a side of the base substrate, wherein one end of each first lead among the plurality of first leads is connected to a respective row among the plurality of rows of first touch patterns, and the other end of each first lead is used for connecting to a flexible circuit board; and wherein one end of each second lead among the plurality of second leads is connected to a respective row among the plurality of columns of second touch patterns, and the other end of each second lead is used for connecting to the flexible circuit board;

a shielding line, arranged on a side of the base substrate, and further arranged on a same layer as the first leads and/or the second leads, wherein the shielding line is at least formed on a side of part of the first leads or the second leads; and a ground line, formed on an edge region of the base substrate, and arranged on a same layer as the first leads and/or the second leads, wherein in a direction in which the shielding line is away from the base substrate, at least one first slit cutting through the shielding line and/or at least one second slit cutting through the ground line is formed; and the at least one first slit extends in a length direction of the shielding line, and the at least one second slit extends in a length direction of the ground line, wherein the first slit divides the shielding line into a plurality of sub-shielding lines;

wherein ends of the plurality of sub-shielding lines away from the flexible circuit board are connected together;

wherein the plurality of sub-shielding lines forms a loop, and wherein, the shielding line comprises a plurality of sub-shielding lines, wherein the plurality of sub-shielding lines of the shielding line are connected to a same pin; and/or the ground line comprises a plurality of sub-ground lines, wherein the plurality of sub-ground lines of the ground line are connected to a same pin.

11. The touch module according to claim 10, wherein at least one end of one sub-shielding line is electrically connected with at least one end of the sub-shielding line adjacent to the one sub-shielding line.

12. The touch module according to claim 11, wherein a difference between a width of the first slit on a side of the sub-shielding line and a width of a spacing is less than 5 µm, wherein the spacing is a spacing between the sub-shielding line and the first lead or the second lead located adjacent to the sub-shielding line on the other side of the sub-shielding line.

13. The touch module according to claim 11, wherein a difference between a width of the sub-shielding line and a width of the first lead or the second lead adjacent to the sub-shielding line is less than 10 µm.

14. The touch module according to claim 10, wherein the shielding line is located between the first leads and the second leads, and/or located between the ground line and the first leads or the first leads.

15. The touch module according to claim 10, wherein the second slit divides the ground line into a plurality of sub-ground lines, and at least one end of one sub-ground line is electrically connected with at least one end of the sub-ground line adjacent to the one sub-ground line.

16. The touch module according to claim 10, wherein each of the first touch patterns comprises a plurality of first electrodes, wherein the plurality of first electrodes in each of the first touch patterns are connected in series through a plurality of first wires; and each of the second touch patterns comprises a plurality of second electrodes, wherein the plurality of second electrodes in each of the second touch patterns are connected in series through a plurality of second wires, wherein an insulation layer is formed between each first wire and a respective second wire.

17. A display device, comprising:
a display module; and
a touch module, wherein
the touch module is arranged on a side of the display module; and
the touch module comprises:
a flexible circuit board, having a plurality of pins; and
a touch substrate, comprising:
a base substrate;
a touch sensing layer, formed on a side of the base substrate, and comprising a plurality of touch patterns arranged in an array, wherein the array comprises a plurality of rows of first touch patterns and a plurality of columns of second touch patterns;
a plurality of first leads and a plurality of second leads, formed on a side of the base substrate, wherein one end of each first lead among the plurality of first leads is connected to a respective row among the plurality of rows of first touch patterns, and the other end of each first lead is used for connecting to a flexible circuit board; and wherein one end of each second lead among the plurality of second leads is connected to a respective row among the plurality of columns of second touch patterns, and the other end of each second lead is used for connecting to the flexible circuit board;
a shielding line, arranged on a side of the base substrate, and further arranged on a same layer as the first leads and/or the second leads, wherein the shielding line is at least formed on a side of part of the first leads or the second leads; and
a ground line, formed on an edge region of the base substrate, and arranged on a same layer as the first leads and/or the second leads, wherein
in a direction in which the shielding line is away from the base substrate, at least one first slit cutting through the shielding line and/or at least one second slit cutting through the ground line is formed; and
the at least one first slit extends in a length direction of the shielding line, and the at least one second slit extends in a length direction of the ground line,
wherein the first slit divides the shielding line into a plurality of sub-shielding lines;
wherein ends of the plurality of sub-shielding lines away from the flexible circuit board are connected together;
wherein the plurality of sub-shielding lines forms a loop, and
wherein,
the shielding line comprises a plurality of sub-shielding lines, wherein the plurality of sub-shielding lines of the shielding line are connected to a same pin; and/or
the ground line comprises a plurality of sub-ground lines, wherein the plurality of sub-ground lines of the ground line are connected to a same pin.

18. The display device according to claim 17, wherein the display device further comprises:
a barrier dam, arranged on the base substrate, and located on a side of the ground line facing a periphery of the base substrate, wherein
a spacing between an orthographic projection on the base substrate of the barrier dam and an orthogonal projection on the base substrate of the sub-ground line close to the periphery of the base substrate is greater than 20 µm.

* * * * *